(12) United States Patent
Kawazoe et al.

(10) Patent No.: US 7,211,455 B2
(45) Date of Patent: May 1, 2007

(54) METHOD FOR MANUFACTURING SEMICONDUCTOR MODULE

(75) Inventors: Takemi Kawazoe, Tokyo (JP); Ko Yoshimura, Tokyo (JP); Tadahito Kanaizuka, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 301 days.

(21) Appl. No.: 10/498,974

(22) PCT Filed: Feb. 19, 2003

(86) PCT No.: PCT/JP03/01767

§ 371 (c)(1),
(2), (4) Date: Jun. 24, 2004

(87) PCT Pub. No.: WO03/071337

PCT Pub. Date: Aug. 28, 2003

(65) Prior Publication Data

US 2005/0019959 A1    Jan. 27, 2005

(30) Foreign Application Priority Data

Feb. 22, 2002  (JP) ............................. 2002-045712

(51) Int. Cl.
*H01L 21/00* (2006.01)
*G02F 1/00* (2006.01)

(52) U.S. Cl. .......................... 438/29; 438/31; 359/321; 359/324; 257/E21.127

(58) Field of Classification Search ................ 438/29, 438/31; 359/321, 324; 257/E21.127
See application file for complete search history.

(56) References Cited

U.S. PATENT DOCUMENTS

| 5,121,451 A | * | 6/1992 | Grard et al. .................. 385/33 |
| 5,898,516 A | | 4/1999 | Shirai et al. ................. 359/324 |
| 2003/0128418 A1 | * | 7/2003 | Sugawara et al. .......... 359/280 |

FOREIGN PATENT DOCUMENTS

| JP | 6-222311 | 8/1994 |
| JP | 9-185027 | 7/1997 |
| JP | 2001-4958 | 1/2001 |

OTHER PUBLICATIONS

V.J. Fratello, et al.; "Innovative Improvements in Bismuth-Doped Rare-Earth Iron Garnet Faraday Rotators"; *IEEE Transactions on Magnetics*; vol. 32; No. 5; Sep. 1996; pp. 4102-4107./Cited in the International Search Report.

* cited by examiner

*Primary Examiner*—William M. Brewster
(74) *Attorney, Agent, or Firm*—Armstrong, Kratz, Quintos, Hanson & Brooks, LLP

(57) ABSTRACT

A method for manufacturing a semiconductor module incorporated with an optical isolator making use of a Faraday rotator formed of a magnetic garnet film in which a magnetically saturated condition is maintained even without any external magnetic field, in which, at the time the magnetic garnet film is exposed to a temperature of 100° C. or more in a step during manufacture, an external magnetic field is applied in the same direction as the direction of magnetization of this magnetic garnet film. This manufacturing method has an advantage that the high-coercivity film magnetic garnet film is not removed from its magnetically saturated condition even when heating steps are present in the course of manufacture.

7 Claims, 2 Drawing Sheets

METHOD FOR MANUFACTURING SEMICONDUCTOR MODULE

BACKGROUND OF THE INVENTION

1. Field of the Invention

This invention relates to a method for manufacturing semiconductor modules such as semiconductor laser modules and semiconductor amplifier modules used in optical communication. More particularly, this invention relates to a method for manufacturing a semiconductor module, in which a high-coercivity film (a film with high coercive force) is not removed from its magnetically saturated condition when a semiconductor module is manufactured and which is incorporated with an optical isolator making use of a high-coercivity film magnetic garnet film in which a magnetically saturated condition is maintained even without any external magnetic field.

2. Description of the Related Art

In the semiconductor laser modules and semiconductor amplifier modules used in optical communication, optical isolators are incorporated in order to stop light from returning to semiconductor elements such as semiconductor lasers. An example thereof is described with reference to FIG. 1.

First, a semiconductor laser module of this type is chiefly constituted of, as shown in FIG. 1, a housing 11, a photodiode 4 disposed in this housing 11 along an optical axis P, a semiconductor laser element 1, a focusing lens 5, an optical isolator 7, and also an optical fiber 8 guided into the housing 11 through a ferrule 9 fitted to a sidewall of the housing 11.

Then, this semiconductor laser module is manufactured through the steps of an assembly described below.

First, the semiconductor laser element 1 is mounted on a semiconductor laser carrier 3 via a heat sink 2. This semiconductor laser carrier 3 is soldered to a base 6 to which the focusing lens 5 has been fastened together with the photodiode 4. On this base 6, the optical isolator 7 is also mounted, and the optical fiber 8 guided into the housing 11 through the ferrule 9 is optically adjusted to the optical isolator 7. Thereafter, these are each fastened.

The base 6 is also fastened to the housing 11, which is made of a metal, through a Peltier element 10, and also the ferrule 9, which protects the optical fiber, is soldered to the housing 11 at its optical-fiber guide-in hole 15.

The semiconductor laser module is further electrically connected to a lead (not shown) in the housing 11 by wiring making use of a bonding wire; the lead projecting to the outside of the housing 11. Thereafter, the housing 11 is closed by fastening thereto a metallic cover 12 at its opening by soldering, and the interior of the housing 11 is made air-tight by hermetic sealing, thus the semiconductor laser module is completed.

Incidentally the optical isolator 7 is constituted of a Faraday rotator formed of a magnetic garnet film and a pair of polarizers disposed on both sides, and a small-sized and strong permanent magnet for saturating the Faraday rotator magnetically is disposed around the Faraday rotator.

Now, in recent year, there is an increasing demand for making the semiconductor laser module compact. With this demand, the space inside the metallic housing has come narrower.

In order to meet the demand for making it compact, a Faraday rotator has been developed which is formed of a special magnetic garnet film that requires no magnet (see Japanese Patent Application Laid-open No. H9-185027).

This magnetic garnet film is called a high-coercivity film because, after it has initially magnetically been saturated by applying an external magnetic field, the magnetically saturated condition is maintained even when the external magnetic field is removed.

Where an optical isolator is made using the Faraday rotator formed of this high-coercivity film, the space inside the metallic housing can be made narrower insofar as it requires no magnet, and such an optical isolator has an advantage in respect of cost.

Now, in the manufacture of semiconductor modules such as the semiconductor laser module, there are various heating steps for the above soldering after the optical isolator has been incorporated in the housing. In some cases, the fastening itself of the optical isolator is carried out by soldering. Also, even where the optical isolator is fastened with an adhesive in place of soldering, heating to about 120° C. is necessary in order to solidify the adhesive, and hence there still is the step of heating.

Even in such a semiconductor module manufacturing process having the steps of heating, there has been no particular problem in the case when the above conventional optical isolator making use of a permanent magnet is incorporated.

However, in the case when the optical isolator making use of a high-coercivity film is incorporated, there has been a problem in that the high-coercivity film that has been fastened with much trouble is undesirably removed from its magnetically saturated condition as a result of the heat treatment for soldering, to return to the original condition of a multiple magnetic domain.

Also in the case when the method is employed in which the optical isolator is fastened with an adhesive in place of soldering, the high-coercivity film may be removed from its magnetically saturated condition as a result of the heat treatment when the adhesive is made to solidify. Once the high-coercivity film has been removed from its magnetically saturated condition, the optical isolator no longer functions as the optical isolator, and hence, where the optical isolator making use of a high-coercivity film is incorporated in the semiconductor module, it has been necessary for the adhesive to be solidified at a relatively low temperature, or to again saturate the high-coercivity film magnetically (hereinafter called "re-magnetize") after the semiconductor module has been assembled.

However, the fastening with an adhesive has had a problem that it involves a lower reliability than the soldering. Also, in order to re-magnetize the high-coercivity film after the semiconductor module has been assembled, it is necessary to heat the semiconductor module to about 100° C. and apply a magnetic field of as strong as $1.6 \times 10^5$ A/m or more from the outside. Hence, this requires an elaborate magnetic-field generation system, and also has caused a problem that the high-coercivity film can not be re-magnetized because no magnetic field is applicable thereto if a magnetic material is present in the semiconductor module.

The present invention has been made taking note of such problems. An object of the present invention is to provide a semiconductor module manufacturing process in which the high-coercivity film is not removed from its magnetically saturated condition even when the step of heating at 100° C. or more is present in the course of manufacture when the semiconductor module incorporated with the optical isolator making use of a high-coercivity film is manufactured.

Accordingly, the present inventors have made extensive studies in order to achieve such an object. As a result, they have reached a technical finding as stated below.

That is, they have discovered that, although the high-coercivity film is removed from its magnetically saturated condition upon an increase in temperature to come into the condition of a multiple magnetic domain so as to not function as the Faraday rotator, it is not removed from its magnetically saturated condition as long as an external magnetic field is present in the same direction as the direction of magnetization of the high-coercivity film even when the magnetic field is weak, namely, where the film is exposed to a temperature at which the Faraday rotator comes to have a small coercive force, its magnetization is retained as long as it is cooled in a state in which an external magnetic field not lower than the coercive force after having been reduced is applied.

The present invention has been accomplished based on such a technical finding.

SUMMARY OF THE INVENTION

The present invention includes a method for manufacturing a semiconductor module incorporated with an optical isolator making use of a Faraday rotator formed of a magnetic garnet film in which a magnetically saturated condition is maintained even without any external magnetic field, wherein at the time the magnetic garnet film is exposed to a temperature of 100° C. or more in a step in the course of manufacture, an external magnetic field is applied in the same direction as the direction of magnetization of magnetic garnet film.

DETAILED DESCRIPTION OF AN EXEMPLARY EMBODIMENT

Figure 1:
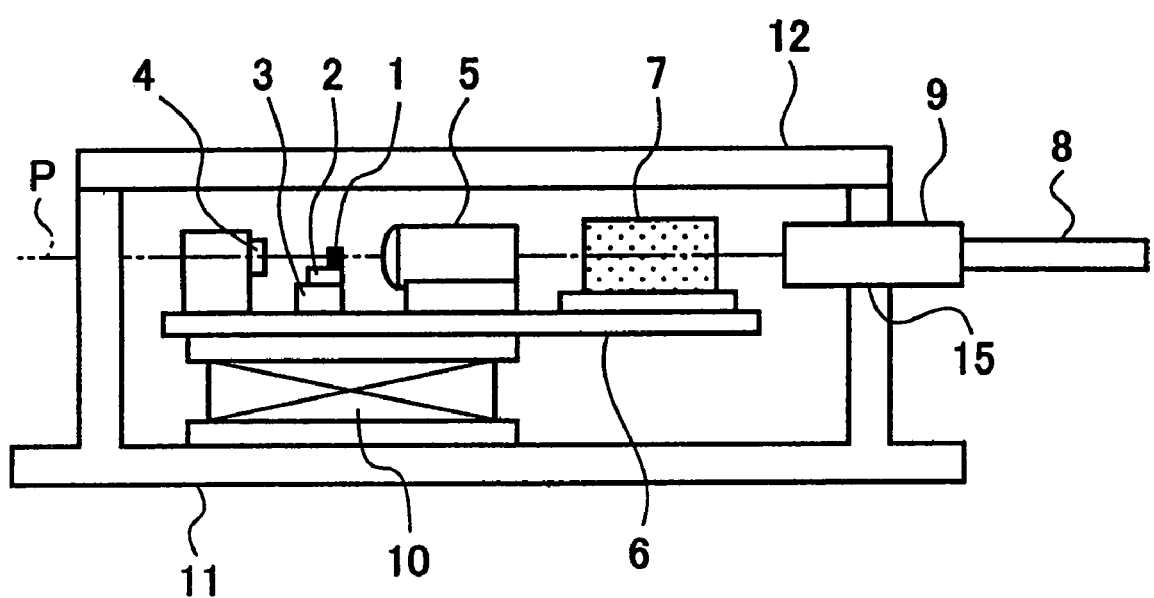
FIG. 1 is a structural sectional view showing an example of a semiconductor module.

The present invention is described below in greater detail.

First, the present invention is a method in which, at the time a high-coercivity film magnetic garnet film is exposed to a temperature of 100° C. or more in a step in the course of manufacture in which a semiconductor module is assembled, an external magnetic field is applied in the same direction as the direction of magnetization of the high-coercivity film so that the high-coercivity film is not removed from its magnetically saturated condition.

Here, the external magnetic field may be applied by a method in which a magnetic field is applied by a coil or a permanent magnet from the outside of a housing of the semiconductor module, or a method in which it is applied from a permanent magnet disposed inside the housing of the semiconductor module, any method of which may be used as desired.

In the present invention, as the magnetic field that is necessary in preventing the high-coercivity film magnetic garnet film from being removed from its magnetically saturated condition, a magnetic field may suffice which is weaker than the magnetic field that is necessary in re-magnetizing the high-coercivity film, the former being a magnetic field not greater than a saturated magnetic field, as is seen from the above technical finding. Hence, a small-sized magnetic-field generation system may be used.

Also in the case when a magnet is disposed inside the housing of the semiconductor module, as the magnetic field that is necessary in preventing the high-coercivity film magnetic garnet film from being removed from its magnetically saturated condition, a magnetic field may suffice which is weaker than the magnetic field that is necessary in saturating a usual magnetic garnet film magnetically. Hence, a small-sized magnet may be used.

As a structure of the above magnet and a method for its disposition, a method may be employed in which a cylindrical magnet is disposed in the housing of the semiconductor module in such a way that it surrounds the Faraday rotator as in usual optical isolators, or a method in which a rectangular magnet is disposed along the optical axis in the vicinity of the Faraday rotator, any of which may be used as desired. Stated specifically, a method may be used in which a platelike magnet is stuck to a spatially allowable part inside the housing, e.g., the back side of the metallic cover, in the semiconductor module. That is, this is because a necessary magnetic field may be applied at least to the high-coercivity film magnetic garnet film.

In the present invention, the intensity of the external magnetic field to be applied to the high-coercivity film magnetic garnet film may arbitrarily be set within a range where the magnetic garnet film can be prevented from being removed from its magnetically saturated condition. It may preferably be set to from $8.0 \times 10^2$ A/m or more to $1.6 \times 10^4$ A/m or less. This is because, if it is less than $8.0 \times 10^2$ A/m, the magnetic garnet film may somewhat be removed from its magnetically saturated condition, and, if a strong magnetic field of more than $1.6 \times 10^4$ A/m is applied, the optical isolator in the housing, which stands exposed to the temperature of 100° C. or more, may desirably move.

Incidentally, a magnetic garnet material in the present invention by which the magnetically saturated condition is maintained even without any external magnetic field may include materials described in the above Japanese Patent Application Laid-open No. H9-185027, and besides bismuth-substituted rare-earth iron garnet materials described in, e.g., Japanese Patent Application Laid-open No. H6-222311 and U.S. Pat. No. 5,898,516.

The present invention is specifically described below by giving Examples.

First, an SmCo magnet was disposed in the vicinity of the high-coercivity film, and the external magnetic field applied to the high-coercivity film was so made different as to be $8.0 \times 10^2$ A/m (Example 1), $4.0 \times 10^3$ A/m (Example 2) and $1.6 \times 10^4$ A/m (Example 3) by changing the distance between the high-coercivity film and the SmCo magnet, and each high-coercivity film was kept for 5 minutes at 200° C. which was a little higher than the melting point of PbSn solder, to observe how the magnetic domain of the high-coercivity film stood.

Incidentally, the direction of magnetization of the high-coercivity film and the direction of the external magnetic field applied to the high-coercivity film were set to be identical. Also, as a Comparative Example, the high-coercivity film was heated to the same temperature as that in the Examples in the state where no external magnetic field was applied thereto, to observe how the magnetic domain of the high-coercivity film stood.

As the high-coercivity film, a magnetic garnet film having composition of $(BiEuHo)_3(FeGa)_5O_{12}$ was used.

The magnetic domain of the high-coercivity film was observed by a method in which a structure having the same disposition as that of the optical isolator making use of the high-coercivity film as the Faraday rotator was set to observe a transmitted-light projection view of the light made to enter this structure.

More specifically, the following method is employed. A pair of polarizers whose directions of transmitted polarized light differ from each other by 45 degrees are disposed on the both sides of the high-coercivity film placing the latter at the middle of the former, and light is made to enter the structure from one polarizer side to observe the light coming transmitted through the high-coercivity film and the other polarizer. In respect of one through which the light is uniformly transmitted (which looks uniformly white as in the transmitted-light projection view shown in FIG. 2) or one through which the light is not uniformly transmitted (which looks uniformly black), the magnetic domain in the high-coercivity film is judged to be a single domain. Also, in respect of one in which a light-transmitted region and a light-untransmitted region stand mixed (which looks like an intermixture of black and white regions as in the transmitted-light projection view shown in FIG. 3), the magnetic domain in the high-coercivity film is judged to be a multiple magnetic domain.

Thus, when the magnetically saturated condition of the high-coercivity film stands fixed, the magnetic domain of the high-coercivity film is in the condition of the single domain; and when stands removed, in the condition of the multiple domain.

The results are shown in Table 1 below.

Figure 2:
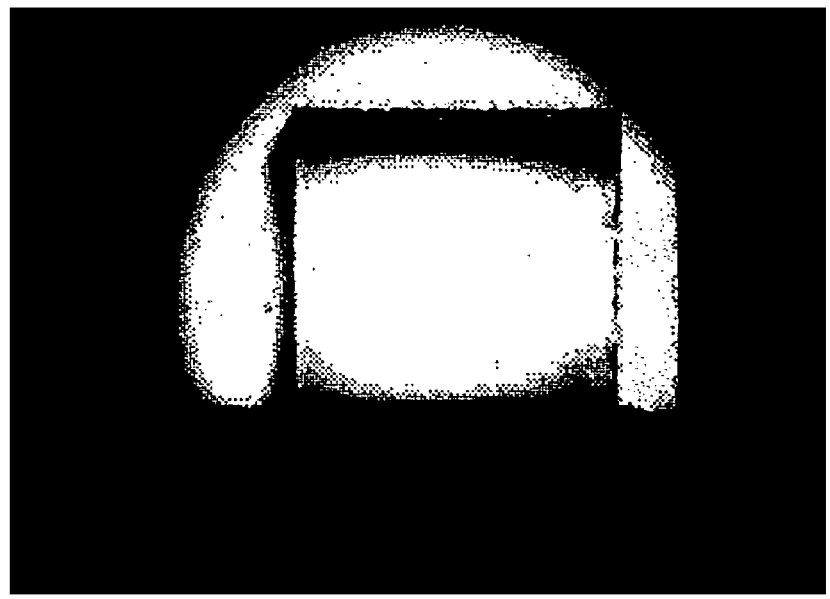
FIG. 2 is a transmitted-light projection view showing how the magnetic domain stands after a high-coercivity film according to Example 1 has been heated.
Figure 3:
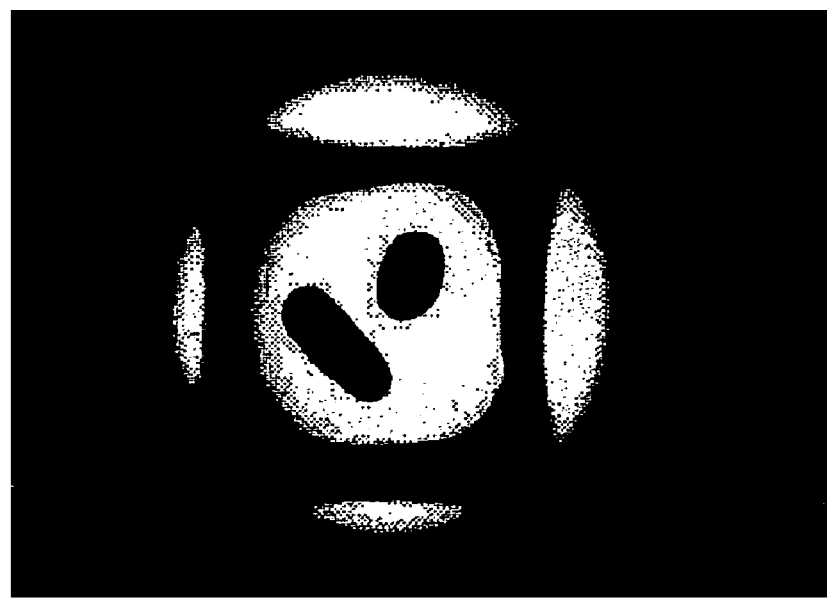
FIG. 3 is a transmitted-light projection view showing how the magnetic domain stands after a high-coercivity film according to the Comparative Example has been heated.

Also shown in FIGS. 2 and 3 are transmitted-light projection views showing how magnetic domains stand after the high-coercivity films according to Example 1 and Comparative Example have been heated, as observed by the above observation method.

TABLE 1

|  | External magnetic field (A/m) | Condition of magnetic domain |
| --- | --- | --- |
| Example 1: | $8.0 \times 10^2$ | single domain |
| Example 2: | $4.0 \times 10^3$ | single domain |
| Example 3: | $1.6 \times 10^4$ | single domain |
| Comparative Example: | none | multiple domain |

From the results of each Example shown in Table 1, it is ascertained that the magnetically saturated condition is kept fixed even when the high-coercivity film is heated for the purpose of soldering, as long as the external magnetic field is applied to the high-coercivity film.

On the other hand, from the results of Comparative Example, it is ascertained that the high-coercivity film is undesirably removed from its magnetically saturated condition when no external magnetic field is applied to the high-coercivity film.

Possibility of Industrial Application

As described above, the high-coercivity film magnetic garnet film is not removed from its magnetically saturated condition even when heating steps are present in the course of manufacture, because an external magnetic field is applied in the same direction as the direction of magnetization of the magnetic garnet film when the high-coercivity film magnetic garnet film is exposed to a temperature of 100° C. or more in the steps in the course of manufacture.

Accordingly, the method is suited for methods of manufacturing semiconductor modules whose high-coercivity films are not required to be re-magnetized.

The invention claimed is:

1. A method for manufacturing a semiconductor module incorporated with an optical isolator making use of a Faraday rotator formed of a magnetic garnet film in which a magnetically saturated condition is maintained even without any external magnetic field,
    wherein at the time said magnetic garnet film is exposed to a temperature of 100° C. or more in a step in the course of manufacture, an external magnetic field is applied in the same direction as the direction of magnetization of said magnetic garnet film.

2. The method for manufacturing a semiconductor module according to claim 1, wherein said external magnetic field has an intensity of from $8.0 \times 10^2$ A/m or more to $1.6 \times 10^4$ A/m or less.

3. The method for manufacturing a semiconductor module according to claim 1 or 2, wherein said external magnetic field is applied by means of a permanent magnet disposed inside a housing of the semiconductor module.

4. The method for manufacturing a semiconductor module according to claim 1 or 2, wherein said external magnetic field is applied by means of a coil or a permanent magnet, disposed outside a housing of the semiconductor module.

5. The method for manufacturing a semiconductor module according to claim 1, wherein said magnetic garnet film comprises a magnetic garnet having composition of $(BiEuHo)_3(FeGa)_5O_{12}$.

6. The method for manufacturing a semiconductor module according to claim 3, wherein said permanent magnet is an SmCo magnet.

7. The method for manufacturing a semiconductor module according to claim 4, wherein said permanent magnet is an SmCo magnet.

* * * * *